(12) United States Patent
Liu et al.

(10) Patent No.: US 11,362,712 B2
(45) Date of Patent: Jun. 14, 2022

(54) ADAPTIVE NUMEROLOGY FOR BEAMFORMING TRAINING

(71) Applicant: Telefonaktiebolaget LM Ericsson (publ), Stockholm (SE)

(72) Inventors: Jinhua Liu, Beijing (CN); Virgile Garcia, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/474,961

(22) PCT Filed: Nov. 16, 2017

(86) PCT No.: PCT/CN2017/111307
§ 371 (c)(1),
(2) Date: Jun. 28, 2019

(87) PCT Pub. No.: WO2018/130002
PCT Pub. Date: Jul. 19, 2018

(65) Prior Publication Data
US 2019/0356368 A1    Nov. 21, 2019

(30) Foreign Application Priority Data

Jan. 10, 2017 (WO) ................ PCT/CN2017/070729

(51) Int. Cl.
*H04W 72/04* (2009.01)
*H04B 7/06* (2006.01)
(Continued)

(52) U.S. Cl.
CPC ......... *H04B 7/0617* (2013.01); *H04B 7/0695* (2013.01); *H04L 5/0048* (2013.01);
(Continued)

(58) Field of Classification Search
None
See application file for complete search history.

(56) References Cited

U.S. PATENT DOCUMENTS 10,367,677 B2 * 7/2019 Parkvall ............... H04B 7/0617
2019/0229789 A1 * 7/2019 Zhang .................. H04B 7/0617

FOREIGN PATENT DOCUMENTS

CN    101895486 A    11/2010
CN    102237923 A    11/2011
(Continued)

OTHER PUBLICATIONS

Intel Corporation, "R1-164189: On UE side beamforming," Third Generation Partnership Project (3GPP), TSG-RAN WG1 #85, May 23-27, 2016, 4 pages, Nanjing, China.
(Continued)

*Primary Examiner* — Willie J Daniel, Jr.
(74) *Attorney, Agent, or Firm* — Withrow & Terranova, PLLC

(57) ABSTRACT

A method for communications is proposed. The method may comprise determining a numerology for beamforming training supportable by a network node and a terminal device. The method may further comprise configuring the numerology for the beamforming training. The numerology may define radio resources with adaptive properties used for transmissions of beamforming training signals. The method may further comprise performing the beamforming training based at least partly on the configured numerology.

15 Claims, 5 Drawing Sheets

(51) Int. Cl.
H04L 5/00 (2006.01)
H04L 27/26 (2006.01)
(52) U.S. Cl.
CPC ........ *H04L 5/0094* (2013.01); *H04L 27/2605* (2013.01); *H04L 5/0007* (2013.01)

(56) References Cited

FOREIGN PATENT DOCUMENTS

| | | |
|---|---|---|
| CN | 102740325 A | 10/2012 |
| CN | 103595455 A | 2/2014 |
| CN | 105245261 A | 1/2016 |
| CN | 105721033 A | 6/2016 |
| WO | 2015089894 A1 | 6/2015 |

OTHER PUBLICATIONS

International Search Report and Written Opinion for International Patent Application No. PCT/CN2017/111307, dated Jan. 26, 2018, 11 pages.
CATT, "R1-1608779: Consideration on SRS transmission for NR," 3rd Generation Partnership Project, TSG RAN WG1 Meeting #86bis, Oct. 2016, 2 pages, Lisbon, Portugal.
NTT Docomo Inc., "R1-1612708: Views on random access channel for NR," 3rd Generation Partnership Project, TSG RAN WG1 Meeting #87, Nov. 2016, 10 pages, Reno, Nevada.
Extended European Search Report for European Patent Application No. 17891862.9, dated Jul. 30, 2020, 8 pages.
Examination Report for European Patent Application No. 17891862.9, dated Mar. 5, 2021, 5 pages.
Examination Report for European Patent Application No. 17891862.9, dated Jul. 14, 2021, 6 pages.

* cited by examiner

ADAPTIVE NUMEROLOGY FOR BEAMFORMING TRAINING

This application is a 35 U.S.C. § 371 national phase filing of International Application No. PCT/CN2017/111307, filed Nov. 16, 2017, which claims the benefit of International Application No. PCT/CN2017/070729, filed Jan. 10, 2017, the disclosures of which are incorporated herein by reference in their entireties.

FIELD OF THE INVENTION

The present disclosure generally relates to communications, and more specifically, relates to wireless communications.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performances. To meet dramatically increasing network requirements, one interesting option for communication technique development is to employ multiple antenna technology. Multiple antenna systems allow transmitting signals focused towards certain spatial regions. This creates beams (also referred to as beamforming) whose coverage can go beyond transmissions using non-beamformed signals but at the cost of narrower coverage. It is a classic trade-off between distance and angular coverage. In next generation communication systems such as 5G or new radio (NR), radio devices are expected to operate with large number of antennas, offering flexibility and potentially very narrow beams and very large focusing gain (also referred to as beamforming gain).

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

In order to achieve the high beamforming gain, beamforming training is needed in multi-antenna networks. However, the beamforming training overhead is larger with higher expected beamforming gain since more training beams (or beam repetitions) need to be transmitted. Therefore, it may be desirable to perform beamforming training with reduced overhead and delay.

The present disclosure proposes a solution for beamforming training, which may enable configuration of an adaptive numerology for the beamforming training, so that more beamforming training signals can be transmitted without additional requirement of antenna system.

According to a first aspect of the present disclosure, there is provided a method implemented at a radio device. The method may comprise determining a numerology for beamforming training supportable by a network node and a terminal device. The numerology may define radio resources with adaptive properties used for transmissions of beamforming training signals. The method may further comprise configuring the numerology for the beamforming training and performing the beamforming training based at least partly on the configured numerology.

In an exemplary embodiment, in response to the numerology for the beamforming training meeting one or more predefined requirements, the method according to the first aspect of the present disclosure may further comprise determining another numerology for beamforming training to replace the numerology for the beamforming training. The another numerology is supportable by the network node and the terminal device. Optionally, the method according to the first aspect of the present disclosure may further comprise configuring the another numerology for the beamforming training to adjust the adaptive properties of the radio resources, and performing the beamforming training based at least partly on the another configured numerology.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer program product comprising a computer-readable medium bearing computer program codes embodied therein for use with a computer. The computer program codes may comprise code for performing any step of the method according to the first aspect of the present disclosure.

According to a fourth aspect of the present disclosure, there is provided an apparatus. The apparatus may comprise a determining module, a configuring module and a performing module. In accordance with some exemplary embodiments, the determining module may be operable to carry out at least the determining step of the method according to the first aspect of the present disclosure. The configuring module may be operable to carry out at least the configuring step of the method according to the first aspect of the present disclosure. The performing module may be operable to carry out at least the performing step of the method according to the first aspect of the present disclosure.

According to a fifth aspect of the present disclosure, there is provided a method implemented at a radio device. The method may comprise obtaining indication information which indicates configuration of a numerology for beamforming training supportable at least by a terminal device. The numerology may define radio resources with adaptive properties used for transmissions of beamforming training signals. The method may further comprise performing the beamforming training based at least partly on the configuration of the numerology.

In an exemplary embodiment, the method according to the fifth aspect of the present disclosure may further comprise transmitting a report from the terminal device to a network node. The report may indicate one or more numerologies for beamforming training supportable by the terminal device. The one or more numerologies comprise the numerology for the beamforming training.

In an exemplary embodiment, the method according to the fifth aspect of the present disclosure may further comprise obtaining new indication information which indicates configuration of another numerology for beamforming training to replace the numerology for the beamforming training. The another numerology is supportable at least by the terminal device. Optionally, the method according to the fifth aspect of the present disclosure may further comprise performing the beamforming training based at least partly on the configuration of the another numerology which adjusts the adaptive properties of the radio resources.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer program product comprising a computer-readable medium bearing computer program codes embodied therein for use with a computer. The computer program codes may comprise code for performing any step of the method according to the fifth aspect of the present disclosure.

According to an eighth aspect of the present disclosure, there is provided an apparatus. The apparatus may comprise an obtaining module and a performing module. In accordance with some exemplary embodiments, the obtaining module may be operable to carry out at least the obtaining step of the method according to the fifth aspect of the present disclosure. The performing module may be operable to carry out at least the performing step of the method according to the fifth aspect of the present disclosure.

In accordance with some exemplary embodiments, the radio resources with adaptive properties may comprise orthogonal frequency division multiplexing (OFDM) symbols having larger sub-carrier spacing (SCS) than that for regular transmissions.

In accordance with some exemplary embodiments, the numerology for the beamforming training may be configured via system information from a network node to the terminal device according to a predefined rule.

In accordance with some exemplary embodiments, the numerology for the beamforming training may be determined by selecting it from one or more numerologies for beamforming training supportable by the terminal device. The one or more numerologies are indicated by a report from the terminal device.

In accordance with some exemplary embodiments, the numerology for the beamforming training may be configured through one or more of the following: signaling between a network node and the terminal device; and an indicator from the network node.

In accordance with some exemplary embodiments, the numerology for the beamforming training is supportable by one or more other terminal devices sharing the beamforming training signals with the terminal device.

In accordance with some exemplary embodiments, the numerology for the beamforming training may be determined based at least partly on one or more of the following: geometry of the terminal device; mobility of the terminal device; a radio link condition; a procedure or a stage of a procedure currently performed for the beamforming training; and allocation of the radio resources used for transmissions of beamforming training signals.

In accordance with some exemplary embodiments, the beamforming training may be performed by combining time multiplexing with at least one of frequency multiplexing and spatial multiplexing.

In accordance with some exemplary embodiments, the radio resources with adaptive properties may be further selectively used for one of the following: guard for link switch; transmissions of additional beam reference signals; repetition of at least a part of beam reference signals; blank transmissions; and short transmissions.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
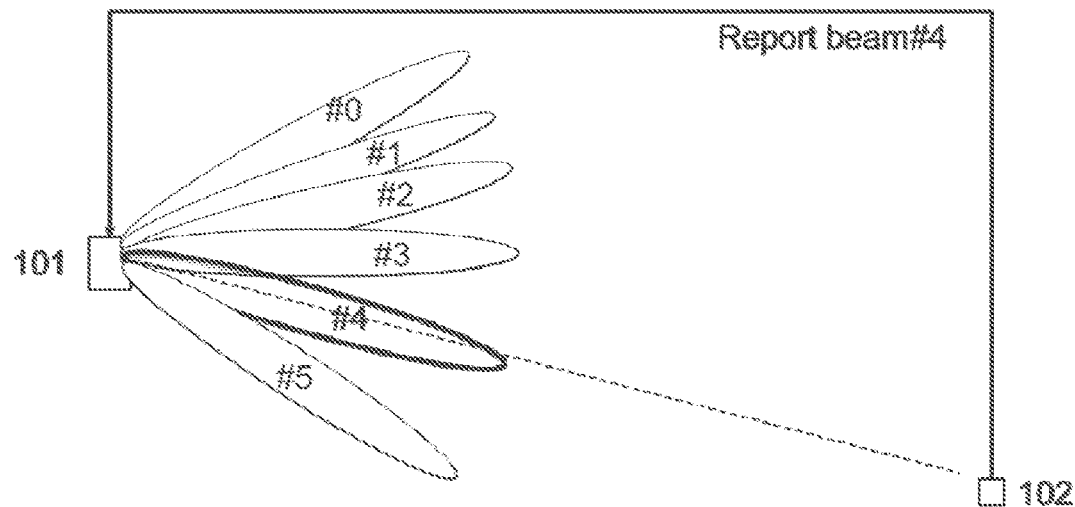
FIG. 1 is a diagram illustrating a simplified beam sweeping procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as Long Term Evolution-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network node" refers to a device in a wireless communication network via which a terminal device accesses the network and receives services therefrom. The network device refers a base station (BS), an access point (AP), a Mobile Management Entity (MIME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network node include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaining terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

In this disclosure, a radio device can be a network or a terminal device. That is, a method proposed according to the disclosure can be implemented at the network node in which beam-forming is used, or the method proposed according to the disclosure can also be implemented at the terminal device in which beam-forming is used.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Beamforming training is performed in multiple antenna systems to achieve the high beamforming gain. The beamforming training procedure may comprise the training for both nodes (a transmitter and a receiver) for a radio connection: transmitting beam training of the transmitter, receiving beam training of the transmitter, transmitting beam training of the receiver and receiving beam training of the receiver.

In order for offering flexibility and potentially very high beamforming gain, radio devices are expected to operate with large number of antennas having narrow beams. Using many of these narrow beams in all directions can guarantee the full cellular coverage. But for a given terminal device such as a user equipment (UE) in a cell, a network node such as the next generation Node B (gNB) needs to know which beam to use. A typical way to determine a suitable beam is to perform a beam sweeping procedure.

FIG. 1 is a diagram illustrating a simplified beam sweeping procedure according to an embodiment of the present disclosure. As shown in FIG. 1, a transmitter 101 transmits reference signals sequentially using all the beams #0 to #5. The receiver 102 scans the beam sweeping resources and reports a beam such as beam #4 with the strongest received power or highest signal to interference plus noise ratio (SINR). Optionally, multiple beams with the received power or SINR higher than a certain threshold may be reported, for example, for back up links, diversity, load balancing, beam combining and so on. Different types of reports may be possible, such as beam index, beam received power, channel quality indicator (CQI) and the like.

For receiving beam training, the transmitter 101 may transmit the reported beam for multiple repetitions and the receiver 102 may try different receiving beams to determine the best receiving beam. Optionally, multiple receiving beams can also be determined and selected as the preferred beams.

Alternatively, the transmitter 101 and the receiver 102 can directly train all the combinations of transmitting and receiving beams. Since there may be too many combinations, a sub-selection of beams can be done to reduce the complexity of training.

It will be appreciated that the beam sweeping can be done between any pair of radio devices (not only gNB and UEs) in both forward link direction and backward link direction, as UEs may also be expected to use beamforming.

The beam sweeping implies large time overhead to scan all directions possible. The narrower the beams, the more beams to be swept. The overhead would become larger if both the transmitter 101 and the receiver 102 need to be trained. Moreover, a UE may have multiple connectivity to different transmission/reception points (TRPs) or different beam sectors belonging to one TRP for the gNB, which means there are multiple link pairs to be trained for the UE.

For a wireless communication network such as NR, there are several factors which may impact the design of beamforming and the related training schemes. For instance, the analogue antenna is of much lower in cost than the digital antenna, but the former needs more training beam transmissions than the latter. For an antenna panel with a larger number of antenna elements, the analogue antenna or the hybrid antenna many have to be used for cost reduction.

On the other hand, multiplexing techniques may be used for data transmissions to achieve more performance gains. Multiplexing can be done in frequency and time, but frequency multiplexing requires a digital beamforming capability for the transmitter and/or the receiver.

The present disclosure proposes a solution for beamforming training. In the proposed solution, an adaptive numerology can be determined and configured for the beamforming training to reduce overhead and enhance the system efficiency. The term "numerology" may be used to refer to some parameters related to the radio resources for signal transmissions, such as the SCS, the length or duration of a cyclic prefix (CP), the length or duration of an OFDM symbol, the number of symbols contained in a time slot, the time slot duration and/or the like.

Figure 2:
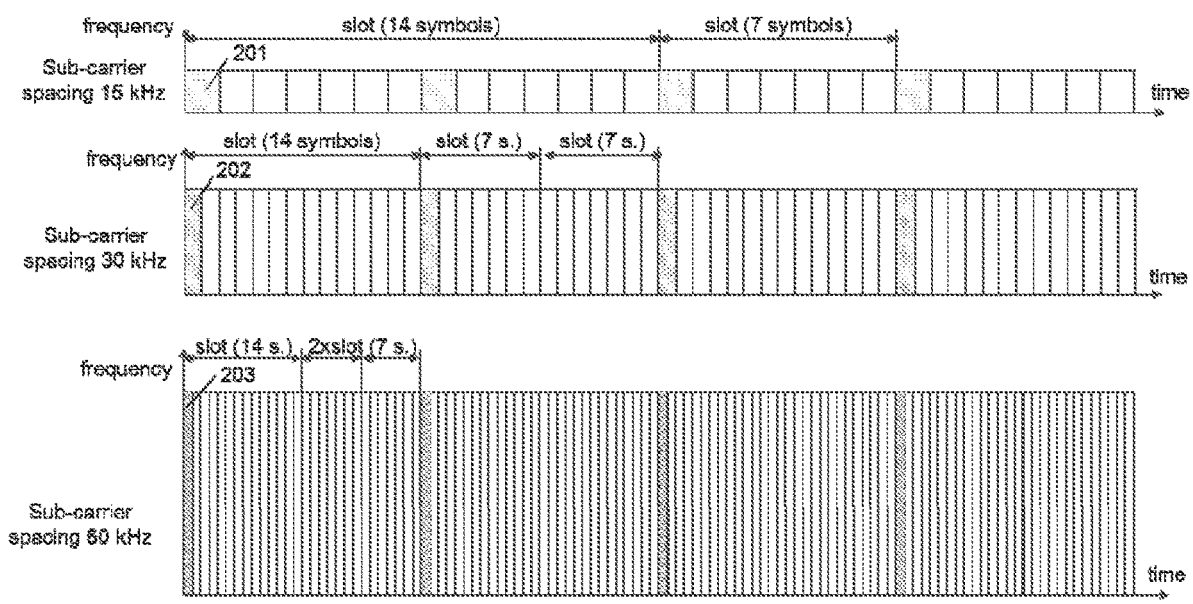
FIG. 2 is a diagram illustrating an example of the time slot duration, OFDM symbol duration and the SCS relationship according to an embodiment of the present disclosure.

FIG. 2 is a diagram illustrating an example of the time slot duration, OFDM symbol duration and the SCS relationship according to an embodiment of the present disclosure. In LTE, the OFDM symbols are created by using 15 kHz SCS, corresponding to the duration of 66.67 µs (without CP). In NR, similar baseline is assumed but various other frequency spacing numerologies are also allowed, such as 30 kHz, 60 kHz and 120 kHz, and it is currently agreed to support the SCS of $2^n \times 15$ kHz (n=1, 2, 3, ... ). These numerologies give shorter OFDM symbol durations, for example, $66.67/2^n$ µs. Thus, using n>1, each OFDM symbol is shorter in time, but wider in the occupied bandwidth.

For example, an OFDM symbol 202 having 30 kHz SCS is twice shorter in time and twice larger in frequency than an OFDM symbol 201 having 15 kHz SCS, as shown in FIG. 2. Similarly, an OFDM symbol 203 having 60 kHz SCS is twice shorter in time and twice larger in frequency than the OFDM symbol 202 having 30 kHz SCS. Accordingly, as the SCS becomes larger, more OFDM symbols can be transmitted in a specific time period.

Taking the advantage of the flexibility of numerology makes it possible to transmit more beamforming training signals, for example by using more OFDM symbols, without additional requirement of the antenna system. In the proposed solution according to some exemplary embodiments of the present disclosure, an adaptive numerology may be configured for performing beamforming training to save the overhead and reduce the delay.

Figure 3:
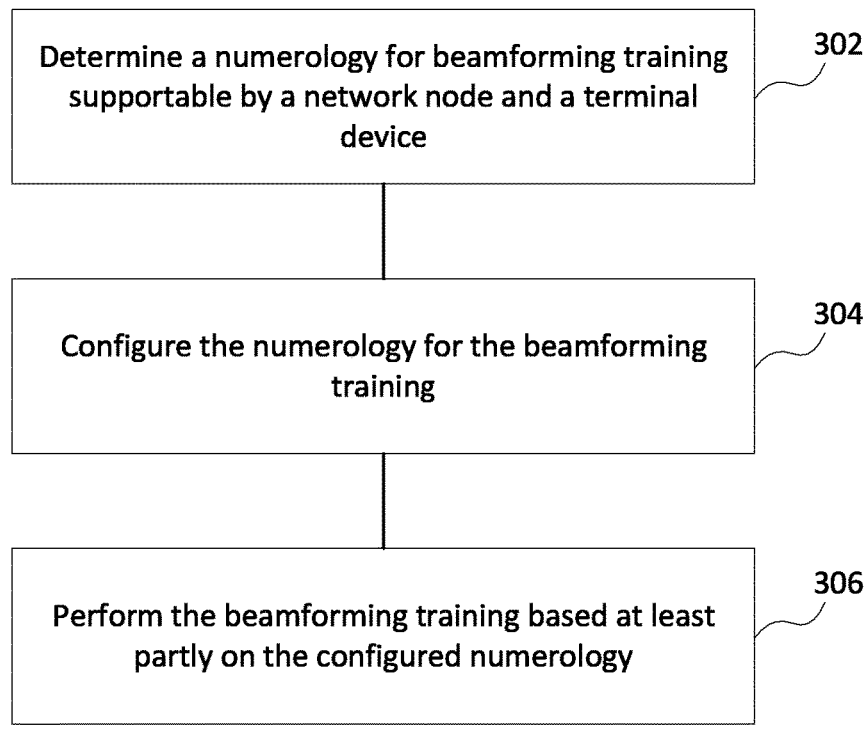
FIG. 3 is a flowchart illustrating a method according to an embodiment of the present disclosure.

FIG. 3 is a flowchart illustrating a method according to an embodiment of the present disclosure. The method illustrated in FIG. 3 may be performed by an apparatus implemented at a network node or communicatively coupled to a network node. In accordance with the exemplary embodiment, the network node may comprise a gNB, an evolved Node B (eNB), a base station (BS), an access point (AP), a communication node, a control center, a relay station, a repeater, or any other network device being capable of participating in communication of a wireless network.

According to the exemplary method illustrated in FIG. 3, a numerology for beamforming training supportable by a network node and a terminal device may be determined at block 302. Optionally, the numerology for the beamforming training may be supportable by one or more other terminal devices sharing the beamforming training signals with the terminal device. For example, it could be possible that the network node wants to share the beamforming training signals between multiple terminal devices in close directions. In this case, the network node would determine or select the numerology supportable by all of the multiple terminal devices sharing the beamforming training signals.

The numerology may define radio resources with adaptive properties used for transmissions of beamforming training signals. In an exemplary embodiment, the radio resources with adaptive properties may comprise OFDM symbols having larger SCS than that for regular transmissions. The regular transmissions may comprise, for example, data transmissions or any other signal transmissions using OFDM symbols with regular SCS.

It will be realized that the radio resources mentioned here may comprise other available transmission resources than OFDM symbols. It is noted that the term of "adaptive properties" used herein and the exemplary illustrations thereof are not limited to the SCS in the context of NR and LTE, but may comprise other flexible properties which can be adjusted adaptively. The proposed methods, apparatus and related products herein may also be applicable to other suitable network environments, for example, various wireless communication systems which are equipped with antenna systems having the high beamforming gain, although some exemplary embodiments are described with respect to NR or LTE.

According to an exemplary embodiment, the numerology for the beamforming training may be determined based at least partly on one or more of the following: geometry of the terminal device, mobility of the terminal device, a radio link condition, a procedure or a stage of a procedure currently performed for the beamforming training, and allocation of the radio resources used for transmissions of beamforming training signals. In other words, the numerology for the beamforming training determined according to the proposed method may be changed adaptively with various situations.

For example, the numerology can be determined conditionally considering the geometry of the terminal device. Geometry is related to the signal quality, typically the pathloss which is dependent on the distance and hence the geometric location. Since the transmission duration with the numerology of larger SCS is shorter and the received power in the receiver side is lower, the transmitter needs to ensure the received power of at least the best transmitting beam is higher than a predefined threshold. Then, the receiver can determine the best transmitting beam from the transmitter and/or the best receiving beam to receive the determined transmitting beam from the transmitter.

In addition, the mobility of the terminal device also may be considered when determining the numerology for the beamforming training. For example, the fast moving terminal device may require more training beams during beam tracking phases. Thus using larger SCS can increase resolution and mitigate frequency selectivity.

The radio condition of a link between the transmitter and the receiver may be an important factor affecting the determination of the numerology. In principle, for a radio link of good radio condition, the transmitter can use larger SCS within the supportable SCS by both the transmitter and the receiver for beamforming training. For a radio link of bad radio condition, the transmitter can use smaller SCS within the supportable SCS by both the transmitter and the receiver for beamforming training. It is noted that the smaller SCS used for the beamforming training mentioned here can still be larger than that for the regular transmissions.

In an exemplary embodiment, the procedure or the stage of a procedure currently performed for the beamforming training may be considered when determining the numerology. The beamforming training procedure may involve one or more of different reference signals for the beamforming training, such as initial primary synchronization signal/secondary synchronization signal (PSS/SSS), sounding reference signal (SRS), channel state information reference signal (CSI-RS), modulation reference signal (MRS), beam reference signal (BRS) and/or the like. Thus, different symbol durations can be configured for different procedures or different stages of a procedure.

For example, for the initial beamforming training, the transmitter does not know the radio condition of the radio link exactly, a numerology with relatively smaller SCS can be determined for beamforming training based on the initial radio quality measurement of the radio link. For the shared beamforming training, the transmitter needs to ensure coverage of the weakest receiver and so uses the SCS which could ensure that the weakest receiver has enough received power. For the beam refinement (or beam tracking) after the initial beamforming training, the transmitter already knows the radio condition of the radio link after the initial beamforming training, then a proper numerology can be determined accordingly for beam refinement (or beam tracking).

It will be appreciated that the transmitter and the receiver described herein are not necessarily directed to the gNB and the UE, but may also be directed to any radio devices with beams which need to communicate in the wireless network, since the beamforming training may also be needed for side links (such as a gNB-to-gNB link, a relaying link, a UE-to-UE link, or the like), in addition to the radio link between the gNB and the UE. In an exemplary embodiment, the network node such as the gNB may plan the resource utilization and be responsible for numerology selection of side links, even it is not one of the communicating nodes.

According to an exemplary embodiment, allocation or scheduling of the radio resources used for transmissions of beamforming training signals may be another important factor for determining the numerology. In general, the determined numerology for the beamforming training may enable sufficient beamforming training signals to be transmitted. Thus, the number of the radio resources such as OFDM symbols which need to be allocated for the beamforming training may be considered when determining the numerology.

In accordance with the exemplary method illustrated in FIG. 3, the numerology for the beamforming training may be configured at block 304. For example, the numerology may be configured via system information from a network node to the terminal device according to a predefined rule. The network node may know in advance that the terminal device can support the configured numerology, according to the predefined rule. The configuration of the numerology for the beamforming training such as beamforming sweeping may be performed via broadcast or on-demand system information.

In an exemplary embodiment, the network node may configure the terminal device to report capabilities with respect to numerology, for example, by using feature group indicator or other suitable signaling. The report from the terminal device may indicate one or more numerologies for beamforming training supportable by the terminal device. Thus, the numerology for the beamforming training determined in block 302 may be selected from the one or more numerologies indicated by the report. Then, the determined numerology for the beamforming training may be configured through one or more of the following: signaling between the network node and the terminal device, and an indicator from the network node.

For example, the network node can semi-statically configure the numerology for the beamforming training through radio resource control (RRC) signaling or media access control-control element (MAC-CE). Alternatively or additionally, the network node can also use dedicated user (or group of users) signaling and/or downlink control indicator (DCI) to dynamically indicate the numerology for beamforming training, such as the beam sweeping configurations comprising OFDM properties. Thus, the numerology indication may be user specific or for a group of users, and can be triggered on demand.

In accordance with the exemplary method illustrated in FIG. 3, based at least partly on the configured numerology, the beamforming training may be performed at block 306. For example, during the beamforming training procedure such as beam-sweeping with the configured numerology, the beamforming training signals such as beam reference signals can be transmitted by using OFDM symbols with larger SCS (corresponding to shorter symbol duration) than the data transmissions.

According to an exemplary embodiment, in response to the current numerology for the beamforming training meeting one or more predefined requirements, another numerology for beamforming training which is supportable by the network node and the terminal device may be determined to replace the current numerology for the beamforming training. Optionally, the another numerology for the beamforming training may be configured to adjust the adaptive properties of the radio resources. For example, the SCS of OFDM symbols used for the beamforming training may be increased or decreased within the supportable range by the network node and the terminal device. Then the beamforming training may be performed based at least partly on the another configured numerology.

The one or more predefined requirements with respect to the numerology for the beamforming training may be related to one or more predetermined thresholds, for example, for the speed of the terminal device, the link quality, the transmission distance, the radio resources allocation, and/or the like. As the context in which the beamforming training is performed may change at different periods, the numerology for the beamforming training may be reconfigured dynamically and some related parameters such as SCS might also be selected adaptively.

Figure 4:
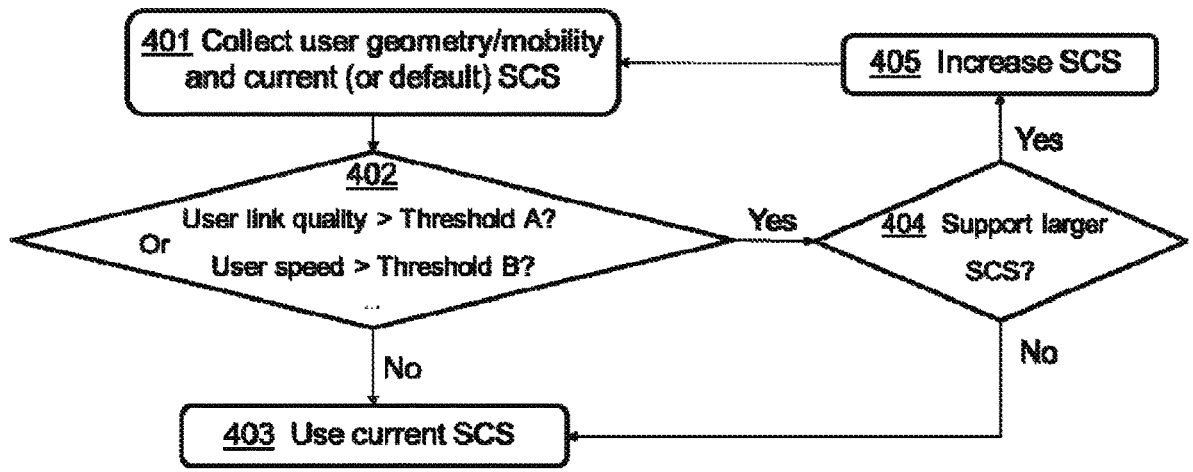
FIG. 4 is a flowchart illustrating adaptive SCS selection according to an embodiment of the present disclosure.

FIG. 4 is a flowchart illustrating adaptive SCS selection according to an embodiment of the present disclosure. As shown in FIG. 4, some context information such as user geometry, user mobility and current (or default) SCS may be collected at block 401. According to the collected context information, it may be determined at block 402 whether one or more predetermined thresholds can be satisfied. The one or more predetermined thresholds may comprise, for example, threshold A for user link quality, threshold B for user speed, and/or the like. If the one or more predetermined thresholds cannot be satisfied, it may be determined to use the current SCS at block 403. Otherwise, a determination as to whether the larger SCS, which may be preset, is supported may be made at block 404. If both the network node and the terminal device can support the larger SCS, the current SCS may be increased at block 405. Otherwise, the current SCS is still used, which means that the numerology for the beamforming training would not be reconfigured. The process of adaptive SCS selection as illustrated in FIG. 4 may be executed periodically or as required during performing the beamforming training, so that the numerology and the associated SCS may be configured adaptively to enhance transmission efficiency.

Figure 5:
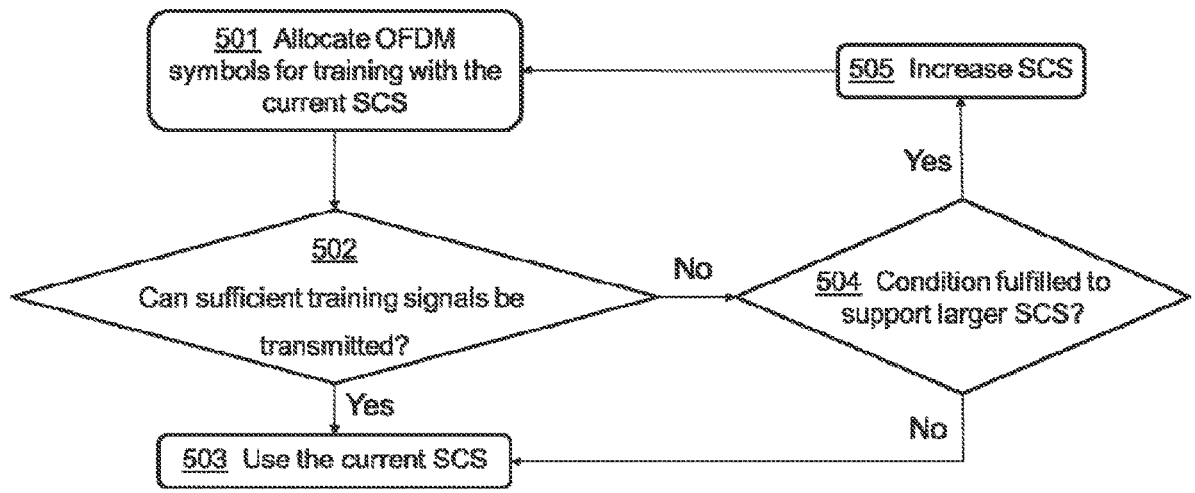
FIG. 5 is a flowchart illustrating adaptive SCS selection according to another embodiment of the present disclosure.

FIG. 5 is a flowchart illustrating adaptive SCS selection according to another embodiment of the present disclosure. As shown in FIG. 5, a certain number of OFDM symbols may be allocated for beamforming training according to the current SCS at block 501. Then, it may be determined at block 502 whether sufficient training signals can be transmitted using the allocated OFDM symbols. If the sufficient training signals can be transmitted, it may be determined to use the current SCS at block 503. Otherwise, a determination as to whether one or more predefined conditions are fulfilled to support larger SCS may be made at block 504. Optionally, the one or more predefined conditions may comprise those associated with the blocks 402 and/or 404 in FIG. 4. Thus, the determination in block 504 may be executed by performing the operations in block 402 and/or block 404. If the one or more predefined conditions are fulfilled, the current SCS may be increased at block 505. Otherwise, the current SCS is still used. Similar to FIG. 4, the process of adaptive SCS selection as illustrated in FIG. 5 also may be executed periodically or on demand during performing the beamforming training, so that the numerology and the associated SCS may be configured adaptively to improve system performance.

It will be realized that the numerology for beamforming training may also be reconfigured to decrease SCS. For example, when the radio link condition changes to being bad, the current numerology may not meet the requirement of the beamforming training procedure or stage to be scheduled, and/or only lower SCS than the current SCS can be supported by the network node and/or the terminal device.

Figure 6:
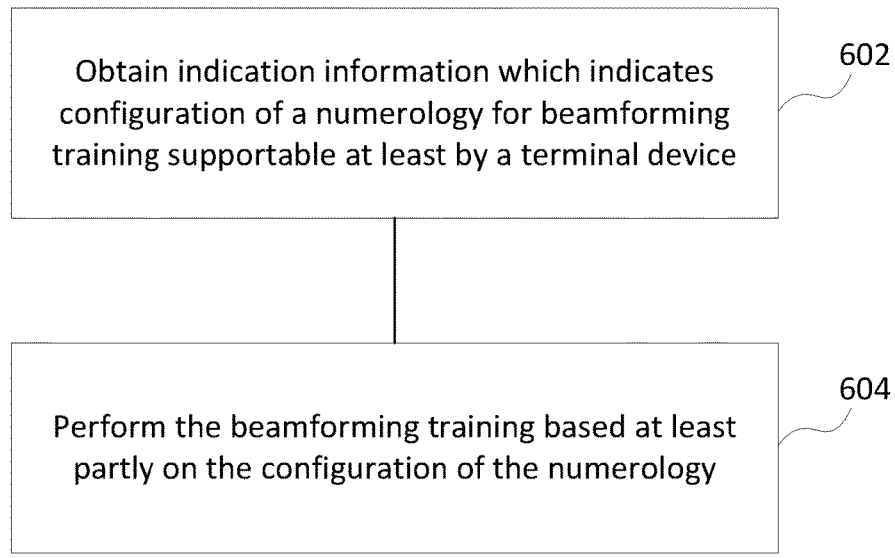
FIG. 6 is a flowchart illustrating a method according to another embodiment of the present disclosure.

FIG. 6 is a flowchart illustrating a method according to another embodiment of the present disclosure. The method illustrated in FIG. 6 may be performed by an apparatus implemented at a terminal device or communicatively coupled to a terminal device. In accordance with the exemplary embodiment, the terminal device may comprise a UE, a mobile station, a wireless device, a personal digital assistant (PDA), a laptop computer, a tablet computer, a smart phone, a portable device, or any other user device being capable of participating in communication of a wireless network.

Corresponding to steps of the exemplary method for beamforming training performed at a network node as illustrated in FIG. 3, the terminal device can obtain indication information at block 602, which indicates configuration of a numerology for beamforming training supportable at least by the terminal device. This numerology for beamforming training may be the one as determined at block 302 in FIG. 3. Optionally, the numerology for beamforming training is also supportable by one or more radio devices which need to perform beamforming training with the terminal device. The radio device may comprise other communication devices than the network node such as gNB. In this case, the network node may be responsible for determining numerology for the beamforming training of a radio link between the radio device and the terminal device. The indication information about the configuration of the numerology may be obtained by the radio device from the network node directly through a communication link between the radio device and the network node. Alternatively or additionally, the radio device can get the indication information about the configuration of the numerology indirectly from the network node, through a communication link (for example, via a specific D2D control channel) between the radio device and the terminal device which obtains the indication information as shown in block 602.

As described in connection with FIG. 3, the numerology may define radio resources with adaptive properties (such as OFDM symbols with large SCS) used for transmissions of beamforming training signals. At block 604, the beamforming training may be performed based at least partly on the configuration of the numerology.

In an exemplary embodiment, the indication information may be obtained via system information from a network node to the terminal device according to a predefined rule. Thus, the terminal device can be configured with the numerology for beamforming training as determined at the network node, without reporting its capability with respect to the numerology to the network node.

Alternatively or additionally, the terminal device may transmit a report to a network node to indicate one or more numerologies for beamforming training supportable by the terminal device. The one or more numerologies comprise the numerology for the beamforming training to be configured as indicated by the indication information. In this case, the indication information may be obtained through one or more of the following: signaling between the network node and the terminal device; and an indicator from the network node.

For example, the numerologies of OFDM symbols used for the beamforming training signals can be semi-statically configured via RRC signaling and/or MAC CE. Alternatively or additionally, physical downlink control channel (PDCCH) could indicate the numerology for the beamforming training dynamically at the cost of overhead.

Optionally, the terminal device may obtain new indication information which indicates configuration of another numerology for beamforming training to replace the numerology for the beamforming training. The another numerology is also supportable at least by the terminal device. Based at least partly on the configuration of the another numerology which adjusts the adaptive properties of the radio resources, the beamforming training can be performed with a higher cost-effectiveness.

Using the numerology of larger SCS for the transmissions of beamforming training signals (in the sense of larger than the regular other transmissions) would mean that more OFDM symbols with larger SCS could be sent during the period of an OFDM symbol with regular SCS. In other words, one OFDM symbol (OFDM type 1) with normal numerology may be divided into multiple OFDM symbols (OFDM type 2) with an adaptive numerology of larger SCS. When the OFDM symbols of type 2 are not used for the beamforming training, they may be used for other signal transmissions for the sake of the efficient use of radio resources.

According to an exemplary embodiment, the radio resources with adaptive properties such as OFDM symbols with higher SCS may be further selectively used for one of the following: guard for link switch; transmissions of additional beam reference signals (which can increase resolution); repetition of at least a part of beam reference signals (which can increase robustness); blank transmissions or no transmissions (for example, for noise/interference measurements); and short transmissions (for example, control feedback, acknowledgement/non-acknowledgment, or the like).

In order for achieving more efficiency, the beamforming training may be performed by combining time multiplexing with at least one of frequency multiplexing and spatial multiplexing. For example, the beamforming training such as beam sweeping using larger SCS can also be done in combination with frequency and/or spatial multiplexing. In the case where multiple digital radio processing chains are equipped in both the transmitting and receiving antennas, using of enhanced time multiplexing with adaptive numerology in combination of frequency multiplexing can further reduce the overhead for beamforming training in some cases. It is noted that the number of simultaneously multiplexed beams in frequency and space would be within supported number of both transmitting and receiving devices (for example, based at least partly on reported maximum ranks).

Figure 7:
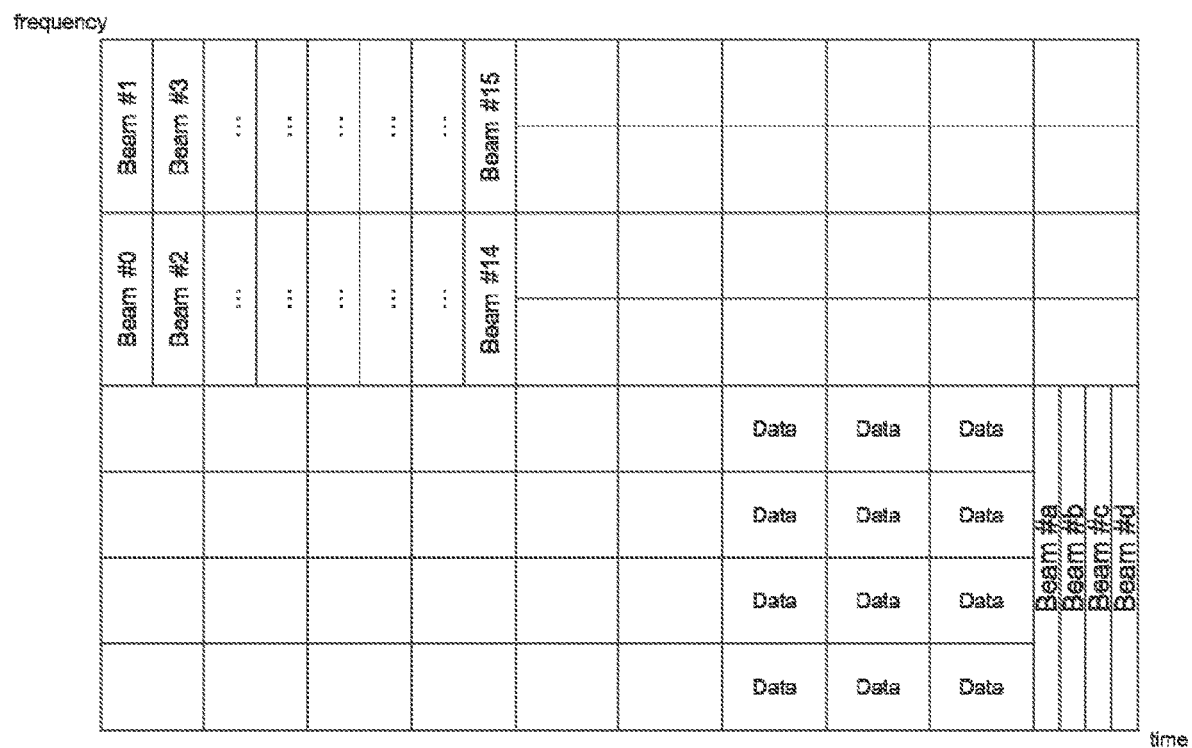
FIG. 7 is a diagram illustrating a time-frequency radio resource grid according to an embodiment of the present disclosure.

FIG. 7 is a diagram illustrating a time-frequency radio resource grid according to an embodiment of the present disclosure. As shown in FIG. 7, first radio resources corresponding to Beam #0 to Beam #15 may be used for a first beamforming training procedure which is possibly common to multiple receivers. Second radio resources corresponding to Beam #a to Beam #d may be used for a second beamforming training procedure which is possibly dedicated to a receiver with embedded data. The first and the second beamforming training procedures are performed with time multiplexing where the used SCS is larger than that for the regular data transmissions, although the first and the second beamforming training procedures use different SCS settings.

As a further example, the first beamforming training procedure is also shown using frequency multiplexing where two frequency slots are used for beamforming training, in addition to using larger SCS where the OFDM symbols are twice shorter in time and twice larger in frequency compared with the regular data transmissions.

The proposed methods as illustrated with respect to FIG. 3 and FIG. 6 can configure an adaptive numerology for beamforming training to fasten the training procedure and reduce overhead. The numerology supported by both the transmitting and receiving hardware and conditions can be configured and used for beamforming training, and may be independent on the rest of the transmissions.

In an exemplary embodiment, the configured numerology makes the OFDM symbols used for beamforming training signals have larger SCS than that for other regular transmissions, so that more training signals (or repetitions of some signals) can be transmitted by the transmitter within the same period. For example, this allows to either fasten the completion of the beam sweeping procedure for a given number of beams, or allows to sweep more beams in a specific time (which increases the spatial resolution), or even allows repetition of beam reference signals to increase robustness.

Taking advantage of the flexible numerology, the proposed methods can further improve the beamforming training by enhancing time multiplexing in combination with the frequency and/or spatial multiplexed beamforming training signal transmissions.

The various blocks or information flows shown in FIGS. 1-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
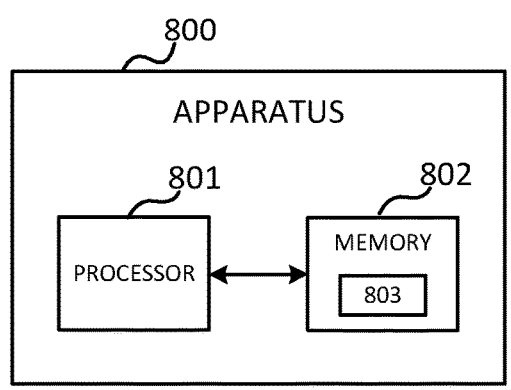
FIG. 8 is a block diagram illustrating an apparatus according to an embodiment of the present disclosure.

FIG. 8 is a block diagram illustrating an apparatus 800 according to some embodiments of the present disclosure. As shown in FIG. 8, the apparatus 800 may comprise one or more processors such as processor 801 and one or more memories such as memory 802 storing computer program codes 803. The one or more memories 802 and the computer program codes 803 may be configured to, with the one or more processors 801, cause the apparatus 800 at least to perform any operation of the method as described in connection with FIG. 3 or FIG. 6. Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Figure 9:
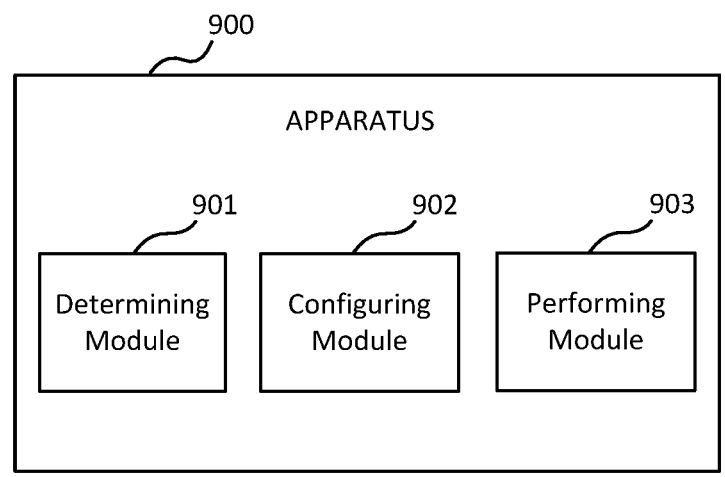
FIG. 9 is a block diagram illustrating another apparatus according to another embodiment of the present disclosure.

FIG. 9 is a block diagram illustrating another apparatus 900 according to some embodiments of the present disclosure. As shown in FIG. 9, the apparatus 900 may comprise a determining module 901, a configuring module 902 and a performing module 903. In an exemplary embodiment, the apparatus 900 may be implemented at a network node. The determining module 901 may be operable to carry out the operation in block 302, the configuring module 902 may be operable to carry out the operation in block 304, and the performing module 903 may be operable to carry out the operation in block 306. Optionally, the determining module 901, the configuring module 902 and/or the performing module 903 may be operable to carry out more or less operations to implement the proposed methods according to the exemplary embodiments of the present disclosure.

Figure 10:
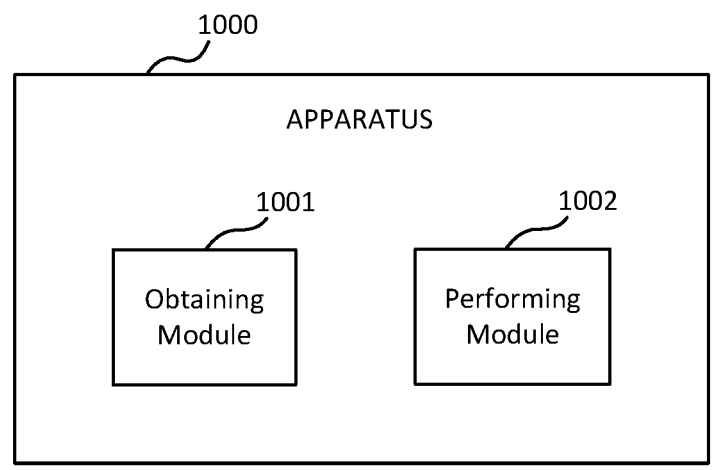
FIG. 10 is a block diagram illustrating yet another apparatus according to a further embodiment of the present disclosure.

FIG. 10 is a block diagram illustrating yet another apparatus according to a further embodiment of the present disclosure. As shown in FIG. 10, the apparatus 1000 may comprise an obtaining module 1001 and a performing module 1002. In an exemplary embodiment, the apparatus 1000 may be implemented at a terminal device. The obtaining module 1001 may be operable to carry out the operation in block 602, and the performing module 1002 may be operable to carry out the operation in block 604. Optionally, the obtaining module 1001 and/or the performing module 1002 may be operable to carry out more or less operations to implement the proposed methods according to the exemplary embodiments of the present disclosure.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, Random Access Memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network node, comprising:
    determining a numerology for beamforming training supportable by the network node and a terminal device, wherein the numerology for the beamforming training is determined by selecting the numerology from one or more numerologies for beamforming training supportable by the terminal device without the terminal device reporting a capability of the terminal device to the network node;
    configuring the numerology for the beamforming training, wherein the numerology defines radio resources with adaptive properties used for transmissions of beamforming training signals, and wherein the radio resources with the adaptive properties comprise orthogonal frequency division multiplexing symbols having larger sub-carrier spacing than that for regular transmissions; and
    performing the beamforming training based at least partly on the configured numerology.

2. The method according to claim 1, wherein the numerology for the beamforming training is configured via system information from the network node to the terminal device according to a predefined rule.

3. The method according to claim 1, wherein the one or more numerologies are indicated by a report from the terminal device.

4. The method according to claim 3, wherein the numerology for the beamforming training is configured through one or more of the following:
    signaling between the network node and the terminal device; and
    an indicator from the network node.

5. The method according to claim 1, wherein the numerology for the beamforming training is supportable by one or more other terminal devices sharing the beamforming training signals with the terminal device.

6. The method according to claim 1, wherein the numerology for the beamforming training is determined based at least partly on one or more of the following:
    geometry of the terminal device;
    mobility of the terminal device;
    a radio link condition;
    a procedure or a stage of a procedure currently performed for the beamforming training; and
    allocation of the radio resources used for the transmissions of the beamforming training signals.

7. The method according to claim 1, wherein in response to the numerology for the beamforming training meeting one or more predefined requirements, the method further comprises:
    determining another numerology for the beamforming training to replace the numerology for the beamforming training, wherein the another numerology is supportable by the network node and the terminal device;
    configuring the another numerology for the beamforming training to adjust the adaptive properties of the radio resources; and
    performing the beamforming training based at least partly on the another configured numerology.

8. The method according to claim 1, wherein the beamforming training is performed by combining time multiplexing with at least one of frequency multiplexing and spatial multiplexing.

9. An apparatus, comprising:
    one or more processors; and
    one or more memories comprising computer program codes,
    the one or more memories and the computer program codes configured to, with the one or more processors, cause the apparatus at least to:
        determine a numerology for beamforming training supportable by a network node and a terminal device without the terminal device reporting a capability of the terminal device to the network node;
        configure the numerology for the beamforming training, wherein the numerology defines radio resources with adaptive properties used for transmissions of beamforming training signals, wherein the numerology for the beamforming training is determined by the network node by selecting the numerology from one or more numerologies for beamforming training supportable by the terminal device, and wherein the adaptive properties comprise orthogonal frequency division multiplexing symbols having larger sub-carrier spacing than that for regular transmissions; and perform the beamforming training based at least partly on the configured numerology.

10. A method implemented at a terminal device, comprising:

obtaining indication information via system information from a network node to the terminal device according to a predefined rule which indicates a configuration of a numerology for beamforming training supportable at least by the terminal device without the terminal device reporting a capability of the terminal device to the network node, wherein the numerology defines radio resources with adaptive properties used for transmissions of beamforming training signals, wherein the numerology for the beamforming training is determined by the network node by selecting the numerology from one or more numerologies for beamforming training supportable by the terminal device, and wherein the radio resources with the adaptive properties comprise orthogonal frequency division multiplexing symbols having larger sub-carrier spacing than that for regular transmissions; and performing the beamforming training based at least partly on the configuration of the numerology.

11. The method according to claim 10, wherein the numerology for the beamforming training is supportable by one or more other terminal devices sharing the beamforming training signals with the terminal device.

12. The method according to claim 10, wherein the numerology for the beamforming training is based at least partly on one or more of the following:

geometry of the terminal device;
mobility of the terminal device;
a radio link condition;
a procedure or a stage of a procedure currently performed for the beamforming training; and allocation of the radio resources used for the transmissions of beamforming training signals.

13. The method according to claim 10, further comprising:

obtaining new indication information which indicates a configuration of another numerology for the beamforming training to replace the numerology for the beamforming training, wherein the another numerology is supportable at least by the terminal device; and performing the beamforming training based at least partly on the configuration of the another numerology which adjusts the adaptive properties of the radio resources.

14. The method according to claim 10, wherein the beamforming training is performed by combining time multiplexing with at least one of frequency multiplexing and spatial multiplexing.

15. An apparatus, comprising:

one or more processors; and
one or more memories comprising computer program codes,
the one or more memories and the computer program codes configured to, with the one or more processors, cause the apparatus at least to:

obtain indication information which indicates a configuration of a numerology for beamforming training supportable at least by a terminal device, wherein the numerology defines radio resources with adaptive properties used for transmissions of beamforming training signals, wherein the numerology for the beamforming training is determined by a network node by selecting the numerology from one or more numerologies for beamforming training supportable by the terminal device without the terminal device reporting a capability of the terminal device to the network node, and wherein the adaptive properties comprise orthogonal frequency division multiplexing symbols having larger sub-carrier spacing than that for regular transmissions; and perform the beamforming training based at least partly on the configuration of the numerology.

* * * * *